UNITED STATES PATENT OFFICE.

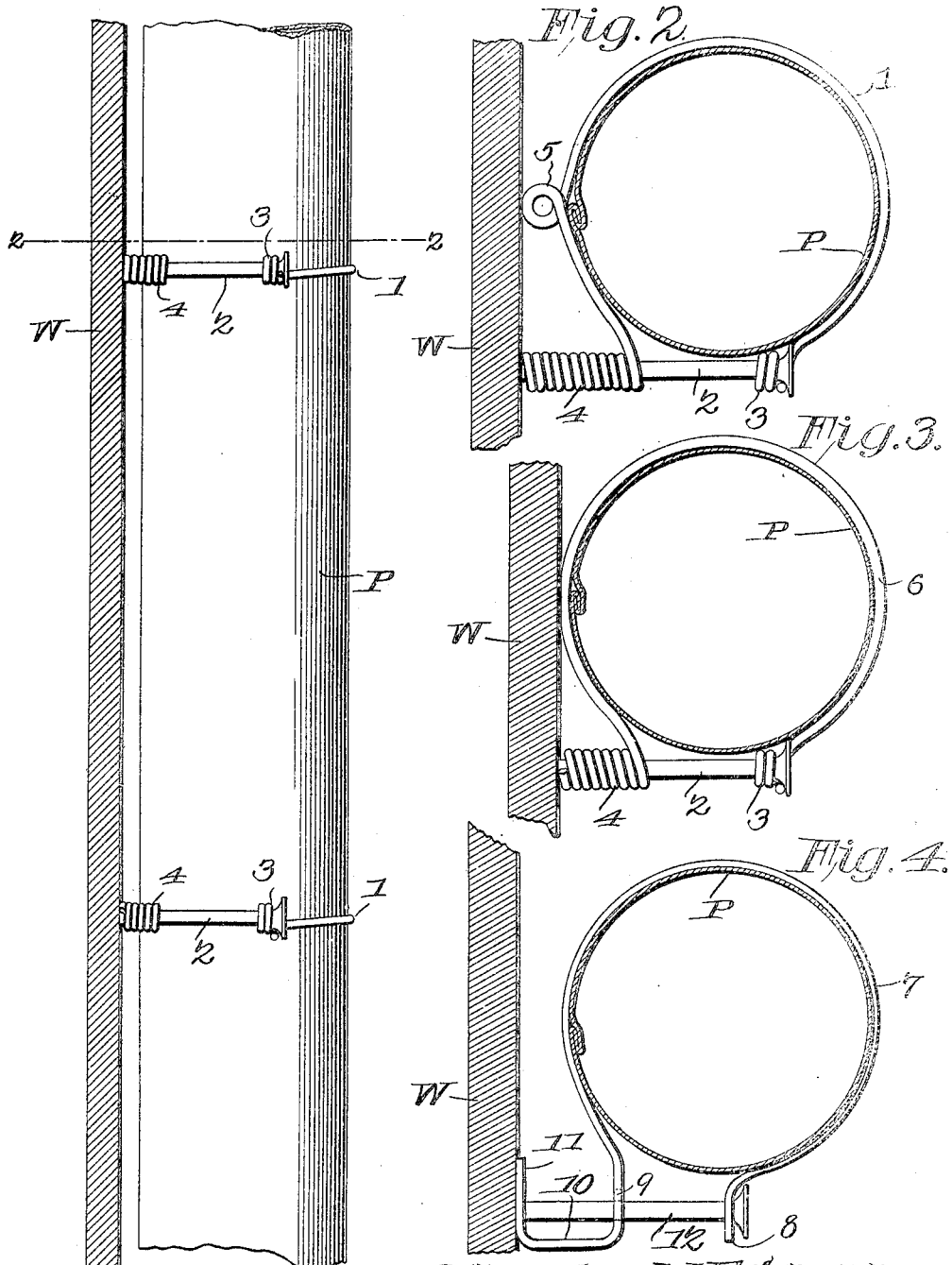

THEODORE N. E. SCHEBLER, OF DAVENPORT, IOWA.

CONDUCTOR-PIPE HOLDER.

No. 820,991.

Specification of Letters Patent.

Patented May 22, 1906.

Application filed March 20, 1905. Serial No. 251,092.

*To all whom it may concern:*

Be it known that I, THEODORE N. E. SCHEBLER, a citizen of the United States, residing at Davenport, in the county of Scott and State of Iowa, have invented a new and useful Conductor-Pipe Holder, of which the following is a specification.

This invention relates to conductor-pipe holders.

The object of the invention is to provide a holder which shall be simple of construction, ready of application, thoroughly effective in holding a conductor-pipe upon a wall or other support, and capable of yielding to the expansion of the pipe, thereby preventing any danger of loosening its securing means.

With the above and other objects in view, as will appear as the nature of the invention is better understood, the same consists in the novel construction and combination of parts of a conductor-pipe holder hereinafter fully described and claimed.

In the accompanying drawings, forming a part of this specification, and in which like characters of reference indicate corresponding parts, Figure 1 is a view in elevation, partly in section, exhibiting a section of pipe held in position upon a wall with a holder embodying one form of the invention. Fig. 2 is a horizontal sectional view, on an enlarged scale, taken on the line 2 2, Fig. 1. Figs. 3 and 4 are views similar to Fig. 2 exhibiting slightly-modified forms of the holders.

Referring to the drawings and to Figs. 1 and 2 thereof, P designates a pipe, which may be a rain-pipe or one of any other character, and W the wall or support from which the pipe is supported. The holder comprises a clamping member 1 and a securing member 2. The clamping member consists of a length of wire the terminals of which are formed into two coils 3 and 4, respectively, and its intermediate portion into a loop or bend 5. Of the coils the first named contains the fewer number of turns and constitutes a tension-transmitting element and the last named the greater number of turns and constitutes a tension-resisting element, the intermediate loop or bend forming a spacing element which operates to hold the pipe from contact with its support, in this instance the wall W, although this part may be the ceiling of a room. The securing member 2 is an ordinary wire or other nail and is passed through the turns of the coils 3 and 4 and is driven into the support, and during this act the clamping member 1 is tightly drawn around the pipe by the contact of the head of the securing member 2 with the coil 3, thereby securing an effective union between the parts, the coil 4 operating to resist the tension exerted upon the clamping member by the securing member, thus permitting a sufficient strain to be applied to the clamping member to cause its assemblage with the pipe to be thoroughly effective for the purpose designed. The term "tension resisting" is a relative one as applied to the element 4, the meaning sought to be conveyed being that the coils of the element will resist tension to a sufficient degree to permit the clamping member to be drawn around the pipe with the requisite tightness to hold the pipe properly positioned, but not to be proof against yielding, as this is not the case, it being designed that the coils of the element 4 shall yield to excessive strain, such as to the expansion of the pipe in cold weather, and by thus yielding to obviate all danger of loosening the securing member and ultimately causing separation from its support. This yielding feature is one of importance, inasmuch as it not only tends to prevent loosening of the securing means, but it also prevents damage to the clamping member, which would inevitably result if it were so firmly secured in position or held in such manner as to preclude a degree of yielding commensurate with that of the pipe.

The spacing element 5 is of value inasmuch as it not only operates to hold the pipe away from the wall, and thus permit free passage of water between it and the pipe, but it also operates to increase the clamping action between the member 1 and the pipe due to a springing tendency, thus to cause the connection between the members to be of greater stability, and, further, this spacing element is also adapted to yield to the expansion of the pipe, and thus further accentuates the features of preventing loosening of the securing members and of removing danger of rupture of the clamping member.

In the form of the invention shown in Fig. 3 the clamping member 6 is the same as that shown in Figs. 1 and 2 with the exception that the intermediate loop or spacing element 5 is dispensed with, the tension-resisting element 4 operating to space the pipe from its support in the same manner as the spacing element.

In the form of the invention shown in Fig. 4 the clamping member 7 is constructed from a flat strip of metal, preferably of galvanized iron, and has one terminal formed into an angular extension 8, constituting the tension-transmitting element, and its other terminal formed into an approximately hollow rectangular extension composed of members 9, 10, and 11, the members 9 and 11 being disposed approximately in parallelism and constituting tension-resisting elements and the member 10 constituting a spacing element that will operate to hold the pipe away from the wall or support in the same manner as the loop 5 in Figs. 1 and 2 and the tension-resisting element 4 in Fig. 3. The member 9 will constitute the yielding element, it being seen that when the pipe expands this will give or assume an angular position to that normally occupied, and thus secure the same results as the element 4 of the other forms of the invention. The securing member 12 may be a wire or other nail and is passed through orifices provided in the parts 8, 9, and 11 and is driven into the wall in the same manner as in the other forms of the invention.

Where the device is used in connection with a brick wall or wall built of masonry, a heavier spike will be employed, and as this will be well understood detailed illustration of such arrangement is deemed unnecessary.

It will be seen from the foregoing description that although the different forms of invention herein exhibited are exceedingly simple in construction they combine in a ready and practical manner all of the essentials requisite to secure the objects designed and, further, that they may be readily manufactured and are not liable to get out of repair from long continued use.

Having thus described the invention, what is claimed is—

1. A pipe-holder comprising a clamping member adapted to surround a pipe and having its terminals formed into spring elements, and a securing member engaging the elements and adapted to produce tension upon the clamping member, one of the elements being adapted resiliently to resist the tension.

2. A pipe-holder comprising a clamping member adapted to surround a pipe and having its terminals formed into coils, and a securing member engaging the coils and adapted to produce tension upon the clamping member, one of the coils being adapted resiliently to resist the tension.

3. A pipe-holder comprising a clamping member adapted to surround a pipe and having its terminals formed into coils and its intermediate portion into a spacing element, and a securing member engaging the coils and adapted to produce tension upon the clamping member, one of the coils being adapted resiliently to resist the tension.

In testimony that I claim the foregoing as my own I have hereto affixed my signature in the presence of two witnesses.

THEODORE N. E. SCHEBLER.

Witnesses:
H. M. MITCHELL,
DAN B. HORNE.